United States Patent [19]

Shibata

[11] 4,368,703

[45] Jan. 18, 1983

[54] TWO STROKE ENGINE HAVING EXHAUST TIMING CONTROL VALVE MEANS

[75] Inventor: Hirotaka Shibata, Hamamatsu, Japan

[73] Assignee: Yamaha, Hatsudoki, Kabushiki, Kaisha, Iwata, Japan

[21] Appl. No.: 223,225

[22] Filed: Jan. 7, 1981

[30] Foreign Application Priority Data

Jan. 30, 1980 [JP] Japan .................. 55/9816

[51] Int. Cl.³ .............................. F02D 9/06
[52] U.S. Cl. .................. 123/323; 123/65 P; 123/65 PE; 123/195 A
[58] Field of Search ............... 123/323, 65 PE, 65 P, 123/195 A

[56] References Cited

U.S. PATENT DOCUMENTS

| 2,133,458 | 10/1938 | Lesage | 123/195 A |
| 2,177,199 | 10/1939 | Lansing | 123/195 A |
| 2,446,919 | 8/1948 | Goldberg | 123/195 A |
| 4,114,586 | 9/1978 | Fujikawa | 123/195 A |
| 4,285,311 | 8/1981 | Iio | 123/323 |

Primary Examiner—Wendell E. Burns
Attorney, Agent, or Firm—Kerkam, Stowell, Kondracki & Clarke

[57] ABSTRACT

A two stroke engine having an exhaust port formed in the cylinder wall. At the upper portion of the exhaust port, there is provided a rotary type exhaust timing control valve which is adapted to be actuated by a centrifugal governor device to control the exhaust timing in accordance with the engine speed. The centrifugal governor device has a governor shaft which extends coaxially with the engine crankshaft and directly connected at one end with the adjacent end of the crankshaft. At the other end, the crankshaft is provided with a magneto device so that the magneto does not have any magnetic influence on the centrifugal governor device.

3 Claims, 3 Drawing Figures

TWO STROKE ENGINE HAVING EXHAUST TIMING CONTROL VALVE MEANS

The present invention relates to two stroke engine and more particularly to two stroke engines having rotary valves for controlling exhaust port timings in accordance with engine speed.

Conventional two stroke engines generally include an exhaust port provided in the cylinder wall so that it is controlled by the piston as the piston reciprocates in the cylinder. It has been recognized that the exhaust port timing has an important effect on the engine performance and that the optimum exhaust timing is dependent on the engine speed. In order to provide an improved engine performance, the exhaust port timing must be advanced under a high engine speed than that under a low engine speed.

In order to meet the aforementioned requirement, there has already been proposed, by Japanese utility model application No. Sho 49-111838 corresponding to the U.S. patent application Ser. No. 781,429 which is a continuation of Ser. No. 612,863 and matured into U.S. Pat. No. 4,121,552, to provide a rotary valve member at the upper portion of the exhaust port. The valve member has a part-circular cross-sectional configuration and rotatable between a retracted position wherein the valve member is retracted from the exhaust port and a projected position wherein the valve member projects into the exhaust port to thereby cover the upper portion of the exhaust port so that the exhaust port timing is changed. In the U.S. patent application Ser. No. 916,751 filed on June 12, 1978 and assigned to the assignee of the present invention, there is disclosed a specific valve structure which is suitable for obtaining a reliable operation.

In order to control the rotary valve in accordance with the engine speed, a centrifugal actuating device is proposed by the United States patent application Ser. No. 61,514 filed on July 24, 1979. According to the proposal, the actuating device includes a driven shaft extending perpendicularly to and driven by the engine crankshaft or a countershaft provided in parallel with the crankshaft. At one end of the driven shaft, there is an actuating rod provided for axial movement with respect to the driven shaft. Between the driven shaft and the actuating rod, there is provided a centrifugal mechanism so that the axial position of the actuating rod is determined with respect to the driven shaft in accordance with the rotating speed of the driven shaft. The actuating rod is connected through an actuating lever with the rotary valve whereby the valve is actuated in accordance with the rotating speed of the driven shaft or the engine speed. The proposed mechanism is, however, complicated in structure because the driven shaft has to be supported at the opposite end portions by bearings and a worm gear mechanism or a bevel gear mechanism has to be used between the driven shaft and the engine crankshaft or the countershaft.

An improved valve actuating mechanism is proposed by the U.S. patent application Ser. No. 153,707 filed on May 27, 1980 and assigned to the same assignee of the present invention. According to the proposal, the valve actuating mechanism includes a driven shaft extending parallelly with the engine crankshaft and having one end connected with the crankshaft to be driven thereby. A centrifugal device is provided at the other end of the driven shaft and connected with the valve device so that the valve device is moved toward the projected position in response to a decrease in the engine speed. The driven shaft may be coaxial and directly connected with the crankshaft so that it is only required to support the driven shaft by a bearing at the other end portion thereof. In this arrangement, however, there is a problem in that the engine crankshaft is generally provided with a magneto for generating electricity. The magneto applies a magnetical influence to the centrifugal device to thereby cause an inaccurate operation of the centrifugal device.

It is therefore an object of the present invention to provide rotary valve actuating device which is not adversely affected by the magnetic mounted on the engine crankshaft.

Another object of the present invention is to provide rotary valve actuating device which can provide an accurate operation of the exhaust timing control valve.

According to the present invention, the above and other objects can be accomplished by a two stroke engine comprising cylinder means, piston means which is received in said cylinder means for reciprocating movement, and crankshaft means connected with said piston means and having power take-off means on one end thereof, magneto means connected with the other end of said crankshaft means, said cylinder means having exhaust port means adapted to be closed by said piston means, exhaust port timing control rotary valve means provided in said exhaust port means at upper portion thereof, said valve means being movable between a projected position wherein it is projected into the exhaust port means to thereby cover the upper portion of the exhaust port means and a retracted position wherein it is retracted from the exhaust port means, centrifugal actuator means connected with said one end of said crankshaft means for moving said valve means between said projected and retracted positions in accordance with engine speed.

According to the features of the present invention, the centrifugal actuator means is provided at a side of the engine opposite to that wherein the magneto means is provided. Therefore, the centrifugal means is free from the influence of the magnetic flux of the magneto means. Thus, it is possible to ensure an accurate operation of the valve means.

The above and other objects and features of the present invention will become apparent from the following descriptions of a preferred embodiment taking reference to the accompanying drawings, in which.

Figure 1:
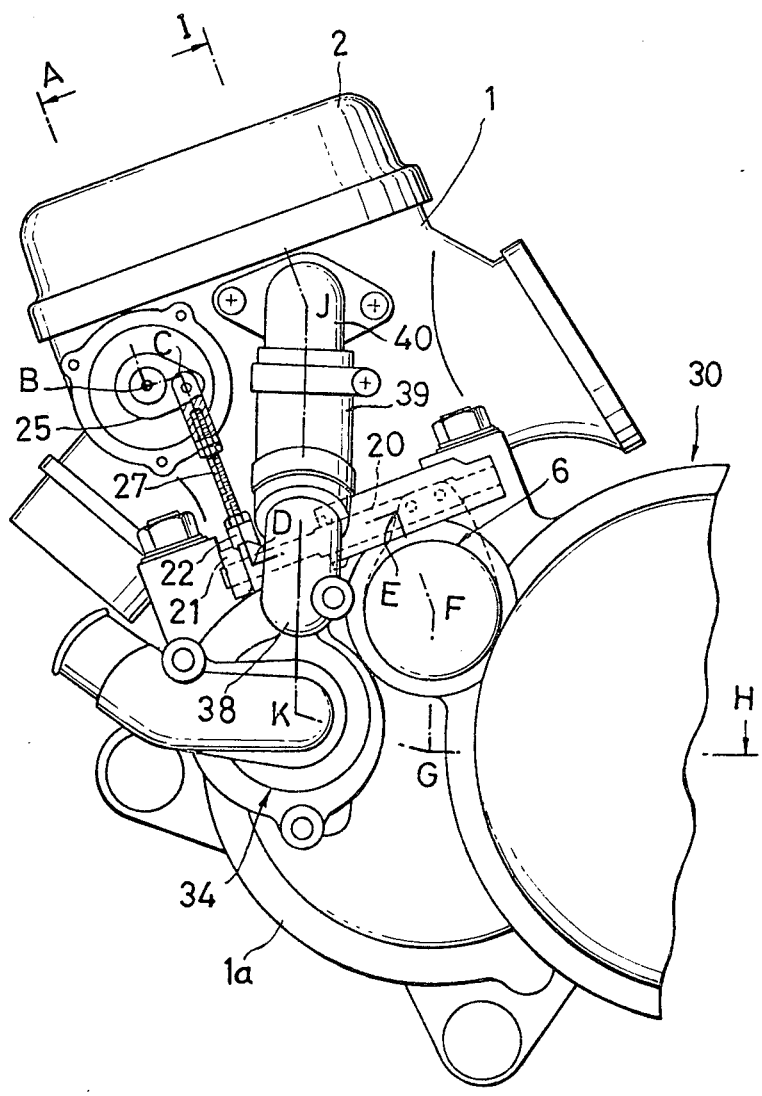
FIG. 1 is a side elevational view of a two stroke engine in accordance with one embodiment of the present invention.

Referring now to the drawings, there is shown a two stroke engine including a cylinder 1, a cylinder head 2 and a crankcase 1a which are connected together in a conventional manner. In the cylinder 1, there is defined a combustion chamber and a piston P is disposed for reciprocating movement. The cylinder 1 is provided with an intake pipe (not shown) which is in communication with an intake port (not shown) formed in the cylinder 1. At the opposite side of the intake pipe, the cylinder 1 is formed with an exhaust port 23 which is in communication with an exhaust passage in an exhaust pipe (not shown).

At the upper portion of the exhaust port 23, there is formed a transversely extending recess 23a which is of a semicircular cross-sectional configuration. A rotary exhaust timing control valve 24 is disposed in the recess 23a. The valve 12 may be of a construction shown and described in the application Ser. No. 916,751 and is of a part-circular cross-sectional configuration having a cut-off surface 24a at one side so as to conform with the upper contour of the exhaust port 23. As shown and described in the application previously referred to, a rotation of the valve 12 results in a change in the exhaust port timing.

Figure 2:
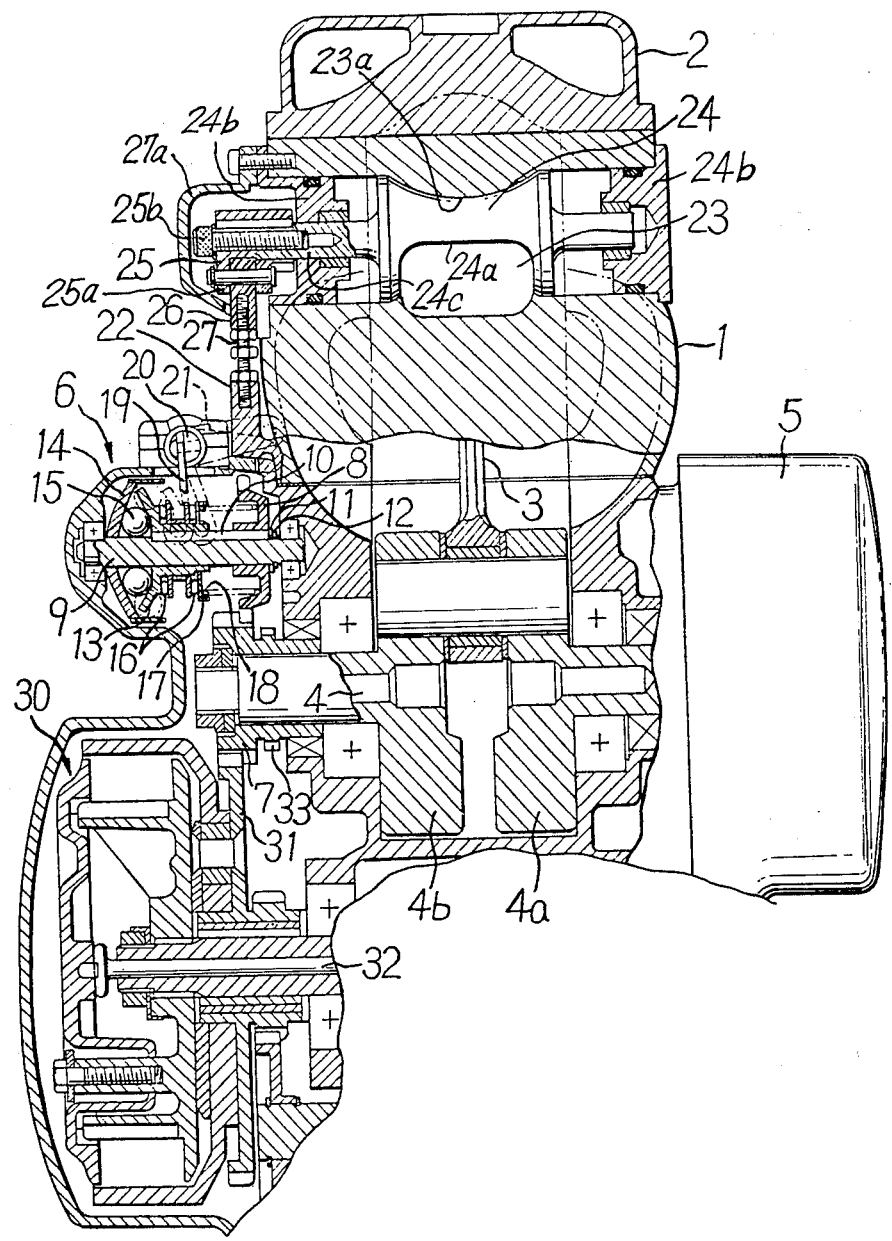
FIG. 2 is a sectional view taken along the line A-B-C-D-E-F-G-H in FIG. 1.
Figure 3:
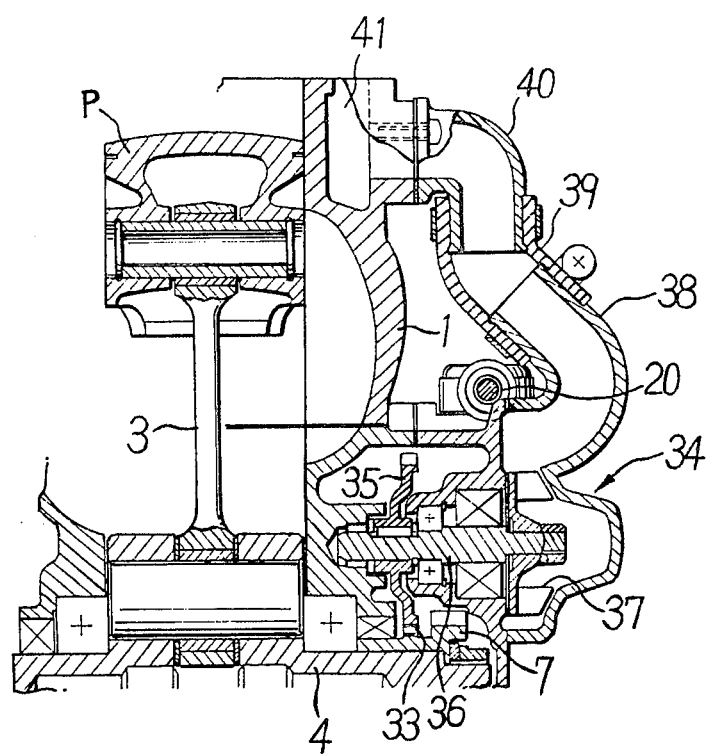
FIG. 3 is a sectional view taken along the line I-J-K-G-H in FIG. 1.

As shown in FIG. 2, the valve 12 is supported at each end by means of a valve holder 24b for rotation about its axis. One end of the valve 24 extends transversely outwardly beyond the valve holder 24b to provide an extension 24c which is connected with a lever bracket 25 having an actuating arm 25a. The lever bracket 25 is fitted to the extension 24c of the valve 24 and secured thereto against relative rotation by means of a bolt 25b. The actuating arm 25a has a free end which is pivotably connected with a rod end fitting 26 at the upper end of an adjusting screw 27. The above described mechanism at the end portion of the valve 24 is covered by a cap 27a which is secured to the cylinder 1 and has a cutoff at the lower portion thereof for passing the screw 26 therethrough.

The engine includes a crankshaft 4 which has crankwebs 4a and 4b and connected with the piston P through a connecting rod 3. At one end of the crankshaft 4, there is provided a magneto assembly 5 for generating an electric power. At the other end of the crankshaft 4, there is a primary drive gear 7 which is splined to the crankshaft 4 and secured thereto by a spring washer and a retaining nut. The drive gear 7 is in meshing engagement with a driven gear 31 as in a conventional arrangement to provide a power take-off device. In the illustrated structure, the driven gear 31 is a clutch drive gear for a clutch assembly 30.

At the same side of the primary drive gear 7, there is provided a centrifugal governor assembly 6 which includes a governor shaft 9 which is in parallel with the crankshaft 4 and has a governor drive gear 8 secured thereto by means of a key 10. The gear 8 is held against axial movement by means of a washer 11 and a retaining ring 12. The gear 8 is in meshing engagement with the primary drive gear 7 to be driven thereby. At the outer end portion of the governor shaft 9, there is provided a rotating disc 14 which is of a substantially conical configuration and secured thereto to rotate as a unit. The rotating disc 14 is so arranged that the inner conical surface thereof is faced to the governor drive gear 8. The rotating disc 14 is formed at the inner conical surface with a plurality of radially extending grooves (not shown) for receiving centrifugal balls 15.

On the governor shaft 9, there is mounted a sliding disc 13 which is adapted to be guided axially along the governor shaft 41 by the key 10. The sliding sids 13 has a conical portion which is opposed to the conical inner surface of the rotating disc 14 to cooperate therewith. The balls 15 are disposed between the discs 13 and 14. The sliding disc 13 has a spring retainer 17 which receives the outer end of a spring 18 extending between the gear 8 and the retainer 17 so that the disc 13 is forced toward the disc 14. The spring retainer 17 is positioned opposite to the conical portion of the sliding disc 13 with a pair of axially spaced thrust bearings 16 disposed therebetween.

The centrifugal governor assembly 6 is associated with a bell-crank lever mechanism which includes a transversely extending shaft 20 rotatably supported above the thrust bearings 16. The shaft 20 has a shift-fork 19 which is secured at the upper end to the shaft 20. The shift-fork 19 extends downwardly and has a lower bifurcated end fitted between the thrust bearings 16. Thus, an axial movement of the sliding disc 13 is converted into a swinging movement of the shift-fork 19 or a rotation of the shaft 20.

The shaft 61 has an upper end having a rod end 22 connected with the lever end of the adjustable screw 27. The rod ends 22 and 26 are attached to the adjustable screw 27 through oppositely directed screw threads so that the effective length of the screw 27 can be readily adjusted simply by rotating the screw 27. For the purpose of securing the rod ends 22 and 26, there are respectively provided lock nuts. It will be understood that, since the governor assembly 6 is located at the side of the engine opposite to the magneto assembly 5, the governer assembly 6 is free from the influence of the magnetic flux from the magneto assembly 5.

In operation of the mechanism described above, the governor shaft 9 of the centrifugal governor assembly 6 is rotated by the engine crankshaft 4 through the gears 7 and 8. The governor discs 13 and 14 are then rotated together with the centrifugal balls 15 so that the balls 15 are forced radially outwardly under the influence of the centrifugal force produced therein. The balls 15 are thus displaced radially outwardly to thereby produce an axial movement of the sliding disc 13 against the influence of the spring 18. The axial movement of the sliding disc 13 is converted into a swinging movement of the fork 9 and therefore a rotation of the shaft 20. Thus, the screw 27 is moved upwardly through the lever 21 to rotate the valve 24. The amount of the upward movement of the screw 27 and therefore the angle of rotation of the valve 24 is dependent on the engine speed, the angle of rotation of the valve 24 being increased as the engine speed increases to advance the exhaust port timing. Since the governor assembly 6 is free from the influence of the magnetic flux from the magneto assembly 5, it is possible to ensure an accurate operation of the governor assembly 6.

In the illustrated embodiment, the primary drive gear 7 is further formed with a gear 33 which is in meshing engagement with a gear 35 for a cooling water pump assembly 34. The pump assembly 34 has an impeller shaft 35 which carries the gear 35 to rotate as a unit. At one end of the impeller shaft 36, there is mounted a pump impeller 37 which supplies cooling water through a water passage formed by a pump casing 38, a hose 39 and a fitting 40 to a water jacket 41 formed at the upper portion of the cylinder 1.

The invention has thus been shown and described with reference to a specific embodiment, however, it should be noted that the invention is in no way limited to the details of the illustrated structure but changes and modifications may be made without departing from the scope of the appended claims. For example, the goverer shaft may be connected with the crankshaft directly or may not necessarily be in parallel with the crankshaft.

I claim:

1. A two stroke engine comprising cylinder means, piston means which is received in said cylinder means for reciprocating movement, and crankshaft means connected with said piston means and having power take-off means on one end thereof, magneto means connected with the other end of said crankshaft means, said cylinder means having exhaust port means adapted to be closed by said piston means, exhaust port timing control rotary valve means provided in said exhaust port means at upper portion thereof, said valve means being movable between a projected position wherein it is projected into the exhaust port means to thereby cover the upper portion of the exhaust port means and a retracted position wherein it is retracted from the exhaust port means, centrifugal actuator means for moving said valve means between said projected and retracted positions in accordance with engine speed, said centrifugal actuator means connected to said one end of said crankshaft means remote from the said magneto means to reduce to a minimum magnetic influences of said magneto means on the centrifugal actuator means.

2. Two stroke engine in accordance with claim 1, wherein said centrifugal actuator means includes a driven shaft means coaxial and connected with the crankshaft means through primary drive gear means on the crankshaft means.

3. Two stroke engine in accordance with claim 1 in which said centrifugal means comprises a disc adapted to be driven by the crankshaft means and having a substantially conical surface, a substantially conical member having a substantially conical surface opposed to said conical surface of the disc with a freedom of axial movement with respect thereto, spring bias means for urging said conical member toward the disc, at least one centrifugal ball provided between said disc and said conical member, means for transmitting the axial movement of the conical member to said valve means.

* * * * *